(12) United States Patent
Ishida et al.

(10) Patent No.: US 7,835,579 B2
(45) Date of Patent: Nov. 16, 2010

(54) IMAGE DISPLAYING APPARATUS THAT RETRIEVES A DESIRED IMAGE FROM A NUMBER OF ACCESSIBLE IMAGES USING IMAGE FEATURE QUANTITIES

(75) Inventors: Takayuki Ishida, Kanagawa (JP); Hirotoshi Maegawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 999 days.

(21) Appl. No.: 11/635,138

(22) Filed: Dec. 7, 2006

(65) Prior Publication Data

US 2007/0133906 A1 Jun. 14, 2007

(30) Foreign Application Priority Data

Dec. 9, 2005 (JP) ............................. 2005-357026

(51) Int. Cl.
*G06K 9/46* (2006.01)
(52) U.S. Cl. .................... 382/190; 382/305; 715/838
(58) Field of Classification Search ............... 715/838; 348/333.05
See application file for complete search history.

(56) References Cited

U.S. PATENT DOCUMENTS

| | | | | |
|---|---|---|---|---|
| 5,751,286 | A * | 5/1998 | Barber et al. | 715/835 |
| 6,097,389 | A * | 8/2000 | Morris et al. | 715/804 |
| 6,823,335 | B2 * | 11/2004 | Ikeda | 1/1 |
| 7,274,834 | B2 * | 9/2007 | Hung | 382/305 |
| 7,644,373 | B2 * | 1/2010 | Jing et al. | 715/838 |
| 2003/0113040 | A1 * | 6/2003 | Nishiyama et al. | 382/305 |
| 2004/0141658 | A1 * | 7/2004 | Haas et al. | 382/278 |
| 2005/0034084 | A1 * | 2/2005 | Ohtsuki et al. | 715/864 |
| 2005/0160377 | A1 * | 7/2005 | Sciammarella et al. | 715/838 |
| 2005/0188326 | A1 * | 8/2005 | Ikeda | 715/788 |

FOREIGN PATENT DOCUMENTS

| | | |
|---|---|---|
| JP | 11 120180 | 4/1999 |
| JP | 2001 101219 | 4/2001 |
| JP | 2001 101220 | 4/2001 |
| JP | 2001 357064 | 12/2001 |

(Continued)

*Primary Examiner*—Brian P Werner
(74) *Attorney, Agent, or Firm*—Frommer Lawrence & Haug LLP; William S. Frommer

(57) ABSTRACT

An image displaying apparatus is provided that is capable of quickly retrieving an image that a user wants to access from a number of images. An image feature quantity calculating section calculates image feature quantities of a plurality of types for each of the images acquired by an image acquiring section. A first image position coordinate calculating section calculates the position coordinate of each of the images in a first space that has coordinate axes corresponding to each of the image feature quantities based on the values of each of the feature quantities. A similarity matrix calculating section and an eigenvalues/eigenvectors calculating section calculate one or a plurality of feature directions in the first space based on the calculated position coordinates. A second image position coordinate calculating section calculates the position coordinate of each of the images in a second space that has coordinate axes corresponding to each of the feature directions. A space image displaying section displays an image showing the whole or a part of the second space that has indications corresponding to each of the images at each of the position coordinates.

21 Claims, 5 Drawing Sheets

FOREIGN PATENT DOCUMENTS

| | | |
|---|---|---|
| JP | 2003 167914 | 6/2003 |
| JP | 2004 185259 | 7/2004 |
| JP | 2005 4727 | 1/2005 |
| JP | 2005 148900 | 6/2005 |
| JP | 2005 184791 | 7/2005 |

* cited by examiner

IMAGE DISPLAYING APPARATUS THAT RETRIEVES A DESIRED IMAGE FROM A NUMBER OF ACCESSIBLE IMAGES USING IMAGE FEATURE QUANTITIES

BACKGROUND OF ART

The present invention relates to an information processing apparatus, a data analyzing method and an information recording medium.

Widespread use of digital cameras and hard disc recorders has enabled recording and storing of a number of static images and dynamic images into various media in an electronic data form. Conventionally, processing for displaying a list of thumbnail images for each image is known in order to facilitate quick access to a necessary image out of the recorded and stored number of images.

However, too many thumbnail images being displayed in order by date confuses users and cannot quickly guide the user to the image the user wants to access. Now, the inventors of this application have developed a technology to display images as a result of analyzing the association between a number of images (elements to be analyzed). According to the technology, among a number of images, a "space image" is displayed where the images that have a higher association with each other are displayed at closer positions and the images that have a lower association with each other are displayed at farther separated positions, thereby enabling a user to quickly retrieve the image they want from a number of images. This technology can be applied not only to static images but also dynamic images, characters and voice data by analyzing the elements to be analyzed for their mutual association and displaying the result as a space image. Specifically, the technology can be used to visualize the results of analysis.

However, according to the study made by the inventors of this application, this technology has a problem in that the number of elements to be analyzed is analyzed immediately for the mutual association between them, which eliminates minute feature differences between the elements to be analyzed and does not produce a result that reflects the differences.

The present invention was made in view of the above problem and one object of the present invention is to provide an image displaying apparatus, an image displaying method and an information recording medium that enables quick retrieval of the image a user wants to access from a number of images.

Another object of the present invention is to provide an image displaying apparatus, an image displaying method and an information recording medium that can visualize the mutual association between a number of elements to be analyzed and can visualize the minute feature differences between a part of the elements to be analyzed as needed.

SUMMARY OF THE INVENTION

In order to solve the above problems, an image displaying apparatus according to the present invention includes: image acquiring means for acquiring a plurality of images; image feature quantity calculating means for calculating values of image feature quantities of a plurality of types for each of the images acquired by the image acquiring means; first image position coordinate calculating means for calculating the position coordinates of each of the images in a first space that has coordinate axes corresponding to each of the image feature quantities, based on the values calculated by the image feature quantity calculating means; feature direction calculating means for calculating one or a plurality of feature directions in the first space, based on the position coordinate calculated by the first image position coordinate calculating means; second image position coordinate calculating means for calculating the position coordinates of each of the images acquired by the image acquiring means in a second space that has coordinate axes corresponding to each of the image feature directions calculated by the feature direction calculating means, based on the feature directions calculated by the feature direction calculating means and the position coordinate calculated by the first image position coordinate calculating means; and space image displaying means for displaying an image showing the whole or a part of the second space where indications according to each of the images are displayed at each of the position coordinates calculated by the second image position coordinate calculating means.

An image displaying method according to the present invention includes: an image acquiring step for acquiring a plurality of images; an image feature quantity calculating step for calculating values of image feature quantities of a plurality of types for each of the images acquired in the image acquiring step; a first image position coordinate calculating step for calculating the position coordinates of each of the images in a first space that has coordinate axes corresponding to each of the image feature quantities, based on the values calculated in the image feature quantity calculating step; a feature direction calculating step for calculating one or a plurality of feature directions in the first space, based on the position coordinates calculated in the first image position coordinate calculating step; a second image position coordinate calculating step for calculating the position coordinates of each of the images acquired in the image acquiring step in a second space that has coordinate axes corresponding to each of the image feature directions calculated in the feature direction calculating step, based on the feature direction calculated in the feature direction calculating step and the position coordinate calculated in the first image position coordinate calculating step; and a space image displaying step for displaying an image showing the whole or a part of the second space where indications according to each of the images are displayed at each of the position coordinates calculated by the second image position coordinate calculating step.

An information recording medium according to the present invention is a computer readable information recording medium that stores a program for enabling a computer to function as: image acquiring means for acquiring a plurality of images; image feature quantity calculating means for calculating values of image feature quantities of a plurality of types for each of the images acquired by the image acquiring means; first image position coordinate calculating means for calculating the position coordinates of each of the images in a first space that has coordinate axes corresponding to each of the image feature quantities, based on the values calculated by the image feature quantity calculating means; feature direction calculating means for calculating one or a plurality of feature directions in the first space, based on the position coordinates calculated by the first image position coordinate calculating means; second image position coordinate calculating means for calculating the position coordinates of each of the images acquired by the image acquiring means in a second space that has coordinate axes corresponding to each of the image feature directions calculated by the feature direction calculating means, based on the feature directions calculated by the feature direction calculating means and the position coordinate calculated by the first image position coordinate calculating means; and space image displaying means for displaying an image showing the whole or a part of the second space where indications according to each of the images are displayed at each of the position coordinates calculated by the second image position coordinate calculating means.

In the present invention, for each image, values of image feature quantities of a plurality of types are calculated, and the position coordinate of each image in a first space is calculated based on these values. The first space has a coordinate axis corresponding to each image feature quantity. The images positioned at closer position coordinates, which are calculated as described above, in the first space can be evaluated to be the ones having similar features. In the present invention, feature directions in the first space are calculated. For example, a direction in a first space along which position coordinates of many images are concentrated can be calculated as a feature direction. Then, the position coordinate of each of the images in the second space that has coordinate axes corresponding to each of the feature directions is calculated, based on the feature direction calculated as described above and the position coordinate of each of the images in the first space.

The coordinate axes in the first space correspond to each of the feature quantities and the feature direction can be evaluated for showing a typical feature of a number of the acquired images. For example, images that are predominantly green and contain certain high spatial frequency components are assumed to be those of plants taken in a macro photography mode and images that are predominantly blue and contain certain low spatial frequency components are assumed to be those of the sea taken in summer. In the present invention, each of the images is placed in a second space that has coordinate axes corresponding to each feature direction and the whole or a part of the second space is caused to be displayed, so that a user can intuitively understand the relationship between each of the images and the typical feature of a number of the acquired images.

In one aspect of the present invention, the first image position coordinate calculating means calculates the position coordinate having coordinate components, each corresponding to each of the image feature quantities, each coordinate component has a value of the corresponding image feature quantity, for each of the images.

In this case, the image feature quantity calculating means may calculate at least a part of the values of the image feature quantities based on color information in a part or the whole of each of the images. This determines the position of the image in the first and second spaces according to the color of the part or whole of the image, so that a user can find an image they want with the help of the color.

The image feature quantity calculating means may calculate at least a part of the values of the image feature quantities based on the values of predetermined spatial frequency components in a part or the whole of each of the images. This determines the position of the image in the first and second spaces according to the spatial frequency of the image, so that a user can find an image they want with the help of the fineness of the image.

The image feature quantity calculating means may calculate at least a part of the values of the image feature quantities based on character information or numeric value information associated with each of the images. This determines the position of the image in the first and second spaces according to the character information such as description of each images or numeric value information such as a date the image was taken, so that a user can find an image they want with the help of the semantic categorization of each image or the date each image was taken.

The image feature quantity calculating means may segment each of the images and calculate at least a part of the values of the image feature quantities based on a value with respect to each segment. This determines the position of the image in the first and second spaces according to the characteristics of the segments of each image, so that a user can find an image they want with the help of the content of the segments.

At this point, the image feature quantity calculating means may calculate at least a part of the values of the image feature quantities based on at least one of the size or the position of a segment presented in each of the images. This allows a user to find an image according to the size or the position of a segment.

Each of the images may be divided into a plurality of block areas and in this case the image feature quantity calculating means calculates a value of the image feature quantity for each block area of each of the images. This allows images having a similar feature quantity at an identical block area to be placed close to each other in the second space and images having an identical composition to be placed close to each other in the second space.

The image feature quantity calculating means may calculate at least a part of the values of the image feature quantities based on a result of processing of face recognition for each of the images. This allows images having a similar result of processing of face recognition (For example, the presence or absence of a face, the position of a face, the size of a face) to be placed close to each other in the second space.

The feature direction calculating means may calculate one or a plurality of eigenvectors of a similarity matrix that contains the similarities between the position coordinates calculated by the first image position coordinate calculating means as elements in order to set the one or a plurality of eigenvectors as the one or a plurality of feature directions.

In this case, the second image position coordinate calculating means may calculate the position coordinate of each of the images acquired by the image acquiring means in the second space based on an inner product of the feature direction calculated by the feature direction calculating means and the position coordinate calculated by the first image position coordinate calculating means.

In order to solve the above problem, an information processing apparatus according to the present invention includes: feature quantity obtaining means for obtaining values of feature quantities of a plurality of types for each of a plurality of elements to be analyzed; first position coordinate calculating means for calculating the position coordinates of each of the elements to be analyzed in a first space that has coordinate axes corresponding to each of the feature quantities, based on the values obtained by the feature quantity obtaining means; feature direction calculating means for calculating one or a plurality of feature directions in the first space, based on the position coordinates calculated by the first position coordinate calculating means; second position coordinate calculating means for calculating the position coordinates of each of the elements to be analyzed in a second space that has coordinate axes corresponding to each of the image feature directions calculated by the feature direction calculating means, based on the feature directions calculated by the feature direction calculating means and the position coordinates calculated by the first position coordinate calculating means; space image displaying means for displaying an image showing the whole or a part of the second space that has indications corresponding to each of the elements to be analyzed, based on each of the position coordinates calculated by the second position coordinate calculating means; and area specifying means for specifying a block area in the second space. When the block area in the second space is specified, the feature direction calculating means recalculates one or a plurality of feature directions in the first space, based on the position coordinates, calculated by the first position coordinate calculating means, in the first space of one or a plurality of specified elements to be analyzed that are the elements to be analyzed having position coordinates in the block area in the second space specified by the area specifying means. The second position coordinate calculating means calculates position coordinates of each of the specified elements to be analyzed in the second space for the specified elements to be analyzed, the second space having coordinate axes corresponding to each of the feature directions that are recalculated by the feature direction calculating means, based on the feature directions that are recalculated by the feature direction calculating means and the position coordinates in the first space for the specified elements to be analyzed. Then, the space image displaying means displays an image showing the whole or a part of the second space for the specified elements to be analyzed that has indications corresponding to the specified elements to be analyzed, based on the position coordinates of each of the specified elements to be analyzed that are calculated by the second position coordinate calculating means.

A data analyzing method according to the present invention includes: a feature quantity acquiring step for obtaining values of a plurality of types of feature quantities for each of a plurality of elements to be analyzed; a first position coordinates calculating step for calculating the position coordinates for each of the elements to be analyzed in a first space that has coordinate axes corresponding to each of the feature quantities, based on the values obtained in the feature quantity acquiring step; a feature direction calculating step for calculating one or a plurality of feature directions in the first space, based on the position coordinates calculated in the first position coordinate calculating step; a second position coordinate calculating step for calculating the position coordinates of each of the elements to be analyzed in a second space that has coordinate axes corresponding to each of the feature directions calculated in the feature direction calculating step, based on the feature directions calculated in the feature direction calculating step and the position coordinates calculated in the first position coordinate calculating step; a space image displaying step for displaying an image showing the whole or a part of the second space that has indications corresponding to each of the elements to be analyzed, based on each of the position coordinates calculated in the second position coordinate calculating step; an area specifying step for specifying a block area in the second space; a step for recalculating one or a plurality of feature directions in the first space, based on the position coordinates, calculated by the first position coordinate calculating means, in the first space of one or a plurality of specified elements to be analyzed that are the elements to be analyzed having position coordinates in the block area in the second space specified in the area specifying step; a step for calculating the position coordinates of each of the specified elements to be analyzed in the second space for the specified elements to be analyzed having coordinate axes that correspond to each of the recalculated feature directions, based on the recalculated feature directions and the position coordinates of each of the specified elements to be analyzed in the first space; and a step for displaying an image showing the whole or a part of the second space for the specified elements to be analyzed that has indications corresponding to the speci-fied elements to be analyzed, based on the calculated position coordinate of each of the specified elements to be analyzed in the second space for the specified elements to be analyzed.

An information recording medium according to the present invention is a computer readable information recording medium that stores a program for enabling a computer to function as: feature quantity obtaining means for obtaining values of feature quantities of a plurality of types for each of a plurality of elements to be analyzed; first position coordinates calculating means for calculating the position coordinates of each of the elements to be analyzed in a first space that has coordinate axes corresponding to each feature quantity based on the values obtained by the feature quantity obtaining means; feature direction calculating means for calculating one or a plurality of feature directions in the first space, based on the position coordinates calculated by the first position coordinate calculating means; second position coordinate calculating means for calculating the position coordinates of each of the elements to be analyzed in a second space that has coordinate axes corresponding to each of the image feature directions calculated by the feature direction calculating means, based on the feature directions calculated by the feature direction calculating means and the position coordinates calculated by the first position coordinate calculating means; space image displaying means for displaying an image showing the whole or a part of the second space that has indications corresponding to the specified elements to be analyzed, based on the position coordinates of each of the elements to be calculated in the second position coordinate calculating means; and area specifying means for specifying a block area in the second space. When a block area in the second space is specified, the feature direction calculating means recalculates one or a plurality of feature directions in the first space, calculated by the first position coordinate calculating means, in the first space of one or a plurality of specified elements to be analyzed that are the elements to be analyzed having position coordinates in the block area in the second space specified by the area specifying means. The second position coordinate calculating means calculates the position coordinates of each of the specified elements to be analyzed in the second space for the specified elements to be analyzed that has coordinate axes corresponding to each of the feature directions that are recalculated by the feature direction calculating means, based on the feature directions that are recalculated by the feature direction calculating means and the position coordinates in the first space for the specified elements to be analyzed. The space image displaying means displays an image showing the whole or a part of the second space for the specified elements to be analyzed that has indications corresponding to the specified elements to be analyzed, based on the position coordinates of each of the specified elements to be analyzed that are calculated by the second position coordinate calculating means.

In the present invention, values of feature quantities of a plurality of types are obtained for each of the elements to be analyzed and also, based on the values, the position coordinate of each of the elements to be analyzed in a first space is calculated. The first space is a space that has coordinate axes corresponding to each of the feature quantities. The elements to be analyzed may be, for example, images, character strings, music, or pictures, and the feature quantities of an image may be defined by coloration, distribution of spatial frequencies, composition, character strings such as a file name of the image, etc. A feature quantity of a character string may be defined by the length, the date of formulation, the type of content the character string is used for, etc. A feature quantity of music may be defined by a length, a frequency distribution, a composer, etc. A feature quantity of a picture may be defined by the producer, the performer, the presence of a key word in the description thereof, etc.

The elements to be analyzed having close position coordinates to each other in the first space, which are calculated as described above, can be evaluated to be the ones having similar features. In the present invention, feature directions in the first space are calculated. For example, a direction in the first space along which position coordinates of many elements to be analyzed are concentrated can be calculated as a feature direction. Then, the position coordinate of each of the elements to be analyzed in a second space that has coordinate axes corresponding to each of the feature directions is calculated, based on the feature directions calculated in this way and the position coordinate of each of the elements to be analyzed in the first space.

A coordinate axis in a second space corresponds to each of the feature directions and the feature direction can be evaluated as an indication of a typical feature of a number of elements to be analyzed. For example, for images as the elements to be analyzed, images that are predominantly green and contain certain high spatial frequency components are assumed to be those of plants taken in a macro photography mode and images that are predominantly blue and contain certain low spatial frequency components are assumed to be those of the sea taken in summer. In the present invention, each of the images is placed in a second space that has coordinate axes corresponding to each feature direction and the whole or a part of the second space is caused to be displayed, so that a user can intuitively understand the relationship between each of the elements to be analyzed.

Moreover in the present invention, a user can specify a block area in the second space. This specifying is preferably done by a pointing device such as a mouse. Then, for the elements to be analyzed (specified elements to be analyzed) placed in the specified block area, the feature directions in the first space are recalculated. The specified elements to be analyzed are arranged in a second space for the specified elements to be analyzed having coordinate axes that correspond to the recalculated feature directions and this situation is displayed. In the present invention, since the feature directions in the first space are recalculated for the specified elements to be analyzed based on the area specification by a user, and a second space for the specified elements to be analyzed is displayed according to the recalculation, minute feature differences between a part of the elements to be analyzed can be visualized as needed.

The information processing apparatus may include means for counting the number of the elements to be analyzed that have position coordinates in a block area in the second space specified by the area specifying means and limiting a recalculation of the feature directions when the counted number is equal to a predetermined number or more. This enhances the convenience of a user when the amount of recalculations of the feature directions is increased so much that it takes a long time to display a second space for specified elements to be analyzed, by limiting the recalculations and display.

The feature direction calculating means calculates one or a plurality of eigenvectors of a similarity matrix that contains similarities between the position coordinates calculated by the first position coordinate calculating means as elements and the one or a plurality of eigenvectors can be set to be the one or a plurality of feature directions. Also the second position coordinate calculating means may calculate the position coordinate of each of the elements to be analyzed in the second space, based on the feature direction calculated by the feature direction calculating means and the position coordinate calculated by the first position coordinate calculating means.

Similarly, the feature direction calculating means may calculate one or a plurality of eigenvectors of a similarity matrix that contains similarities between the position coordinates, calculated by the first position coordinate calculating means, of each of the specified elements to be analyzed in the first space as elements in order to obtain the one or a plurality of eigenvectors as the one or a plurality of feature directions again. The second position coordinate calculating means may calculate the position coordinate of each of the elements to be analyzed in second space for the specified elements to be analyzed, based on an inner product of the feature direction recalculated by the feature direction calculating means and the position coordinate of each of the specified elements to be analyzed in the first space that is calculated by the first position coordinate calculating means.

DETAILED DESCRIPTION OF THE PREFERRED EMBODIMENTS

Now, an embodiment of the present invention will be explained in detail below with reference to the accompanying drawings.

An image displaying apparatus according to the embodiment is configured to display images that are recorded and stored by image pick up devices such as a digital camera or images that are collected via networks such as the Internet on a monitor in a form that allows a user to easily understand the mutual association between the images, which is achieved by executing a program according to this embodiment in a computer.

Figure 1:
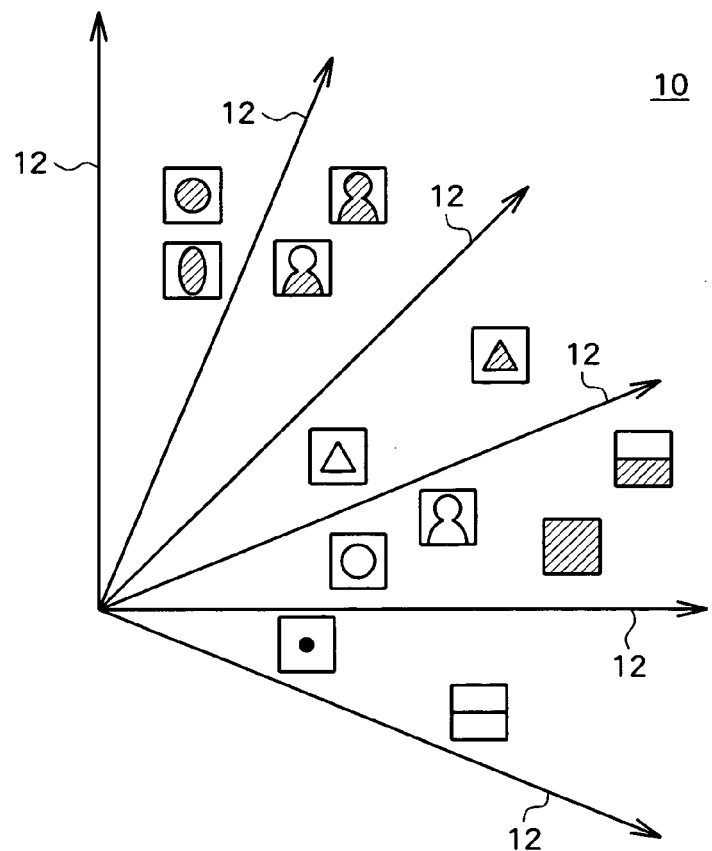
FIG. 1 is a conceptual diagram showing a first space.

FIG. 1 is a conceptual diagram illustrating processing in an image displaying apparatus of the present invention and in this embodiment, first, a number of images to be displayed are placed in a first space 10. The first space 10 has a number of coordinate axes 12 that each corresponds to a feature quantity of the images.

For example, one of the coordinate axes 12 corresponds to an average value of a red component used in a predetermined area of an image, another of the coordinate axes 12 corresponds to an average value of a green component used in a predetermined area of an image and still another of the coordinate axes 12 corresponds to an average value of a blue component used in a predetermined area of an image.

The other of the coordinate axes 12 corresponds to the number of times a certain word (for example, "sea" or "mountain") is used in a character string data (for example, data of explanations for images or data of file names for images) in association with an image (or corresponds to a value that represents the presence of the word) and the other of the coordinate axes 12 corresponds to a value that represents whether a date an image was taken is within a predetermined period of time or not. Moreover, the other of the coordinate axes 12 corresponds to the number of the segments of a predetermined size in a predetermined area when an image is segmented and the other of the coordinate axes 12 corresponds to the number of faces in an image (or corresponds to a value that represents the presence of a face) and one of the coordinate axes 12 corresponds to a total amount of spatial frequency components within a predetermined range in an image.

In this embodiment, after a number of images to be displayed are acquired, a value of each of the above feature quantities for each image is calculated. In order to set the value of each feature quantity to be a component of a coordinate axis corresponding to the feature quantities, the position coordinate in the first space for each image is calculated. The following formula (1) is used to calculate the position coordinate gi in the first space for the ith image.

blue component in each of the block areas A1 to A12 of the image, by a weighting factor ωc.

In the above formula (1), the values of gp+1i to gqi can be obtained by individually multiplying g'p+1i to g'qi, which are the numbers a certain word is included in a character string data in association with the image, by a weighting factor ωc. Also, in the above formula (1), the values of gq+1i to gri can be obtained by individually multiplying g'q+1i to g'ri, which are the numbers whether a date the image was taken is within a predetermined period of time or not, by a weighting factor ωc.

Figure 3:
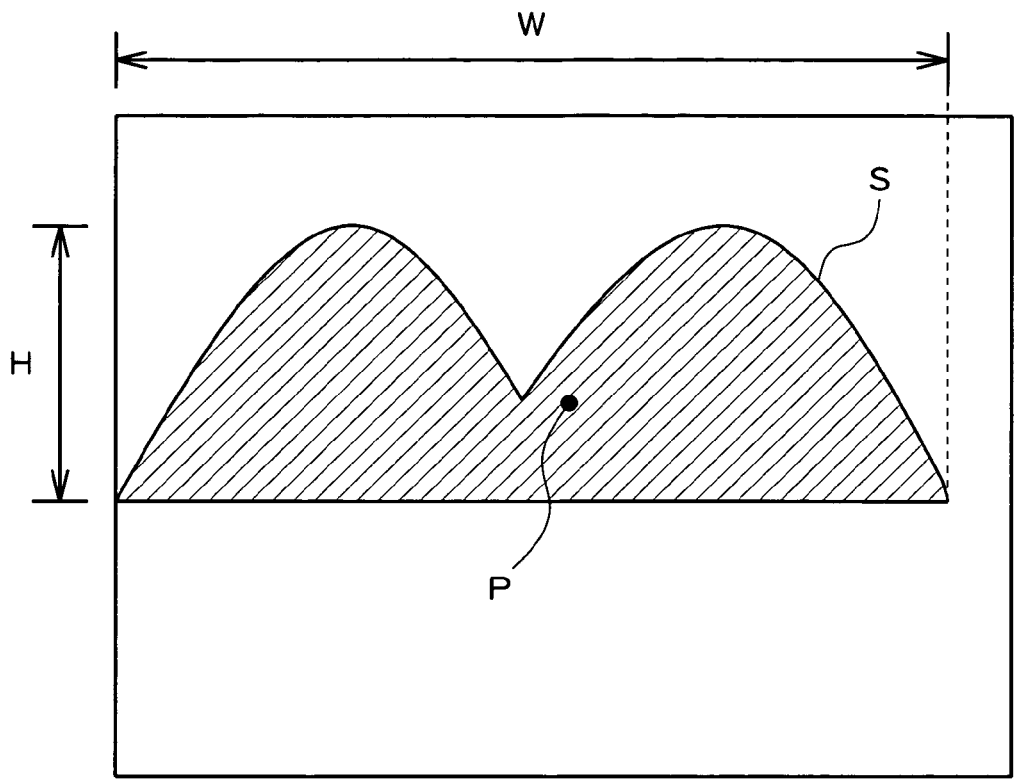
FIG. 3 is a diagram showing a value of a segment that is included in an image.

In this embodiment, each image is segmented. This segmentation is processing to divide an image into block areas that have similar features and for example, in processing of segmentation, block areas that contain a group of pixels having color information within a predetermined color difference are selected as one segment. In this processing, as shown in FIG. 3, a center of gravity P, a height H and a width W of each segment S are calculated. Also in the above formula (1), the values of gr+1i to gsi can be obtained by individually multiplying g'r+1i to g'si, which are the numbers of the segments S that have the heights H or the widths W satisfying a predeter-

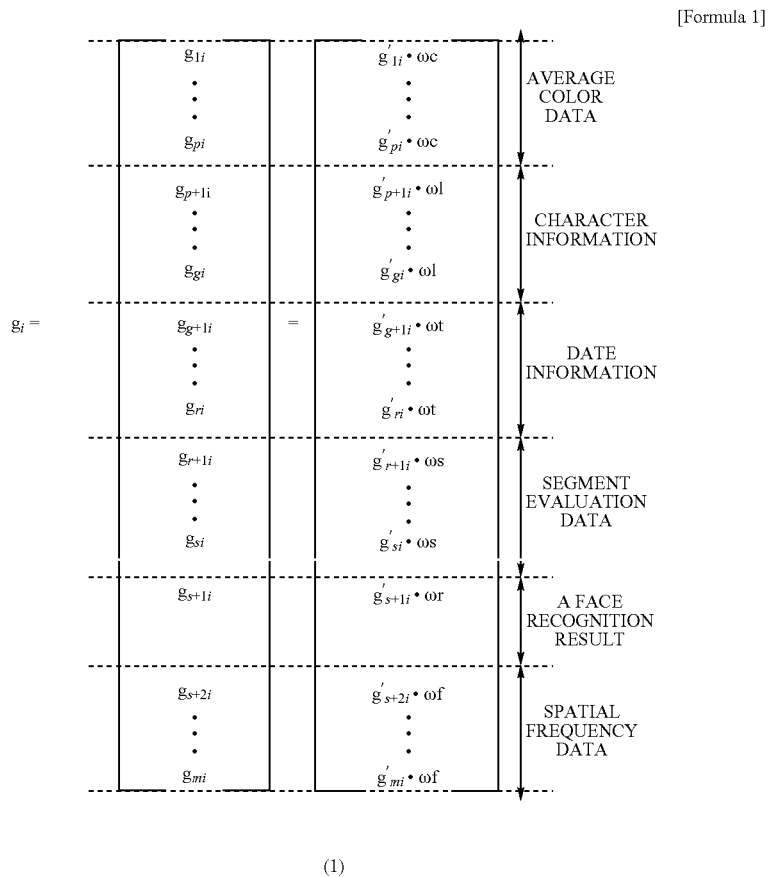

[Formula 1]

(1)

Figure 2:
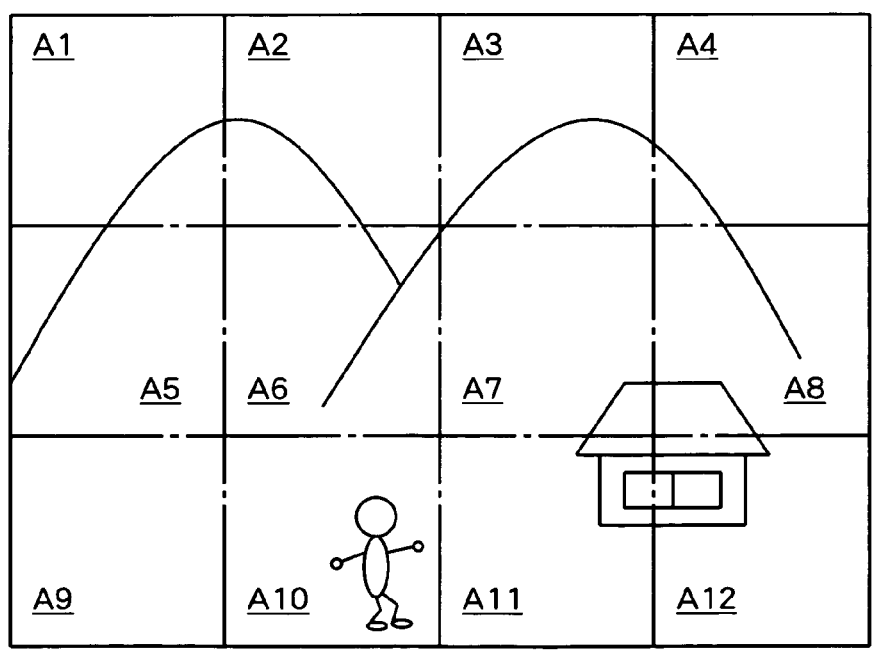
FIG. 2 is a diagram illustrating an approach for calculating a value of a feature quantity from images.

As shown in FIG. 2, an image to be displayed is divided into 12 blocks in matrix form and a value of a feature quantity for each block area is calculated as needed. In the above formula (1), gki (k=1 to m) is the kth component of the position coordinate gi and the values of g1i to gpi can be obtained by individually multiplying g'1i to g'pi, which is an average value of a red component, a green component and a mined condition and have the positions of center of gravity P in the block areas A1 to A12 of each image, by a weighting factor ωs.

In this embodiment, face recognition processing is applied to each image and in the above formula (1), the value of gs+1i can be obtained by multiplying g's+1i that is the number of a face in an image by a weighting factor ωr. Furthermore, in the above formula (1), the values of g's+2i to gmi can be obtained by individually multiplying g's+2i to g'mi, which are the total amount of spatial frequency components within a predetermined range in each image, by a weighting factor ωf. In FIG. 1, each image is placed at the position coordinates in the first space 10 that are calculated as described above.

Next, in this embodiment, based on the position coordinate of each image placed in the first space 10, one or a plurality of feature directions in the first space 10 are calculated. A feature direction may be, for example, a direction that shows a place where a concentration of images can be found in the first space 10. In this embodiment, such a feature direction in the first space 10 is calculated as explained below. That is, the following formula (2) is used to calculate a similarity Hij between the position coordinate gi of the ith image and the position coordinate gj of the jth image in the first space 10 and also the following formula (3) is used to calculate a similarity matrix N×N consisting of ij elements of the similarity Hij, where N is the total number of images. All or some of the eigenvectors in the similarity H are set to be the feature directions.

[Formula 2]

$$Hij = \sum_k \frac{g_{ki} \cdot g_{kj}}{\|g_i\| \cdot \|g_j\|} = \frac{g_i \cdot g_j}{\|g_i\| \cdot \|g_j\|} \quad (2)$$

[Formula 3]

$$H = \begin{pmatrix} H_{11} & H_{12} & H_{13} & \ldots & H_{1n} \\ H_{21} & H_{22} & H_{23} & \ldots & H_{2n} \\ H_{31} & H_{32} & H_{33} & \ldots & H_{3n} \\ \vdots & \vdots & \vdots & & \vdots \\ H_{n1} & H_{n2} & H_{n3} & \ldots & H_{nn} \end{pmatrix} \quad (3)$$

The similarity matrix is a real symmetric matrix and eigenvectors of the matrix can be calculated by using a power method. Since the power method has an effect of heightening feature elements and equating non-feature elements among the matrix elements, the eigenvectors calculated by using the power method can be evaluated to be the elicited feature directions contained in the first space 10. The way of calculating feature direction is not limited to the above example for the eigenvectors in the similarity H and any way may be used as long as feature directions in the first space can be calculated. For example, a direction along which many images are concentrated in the space 10 can be set to be a feature direction.

Figure 4:
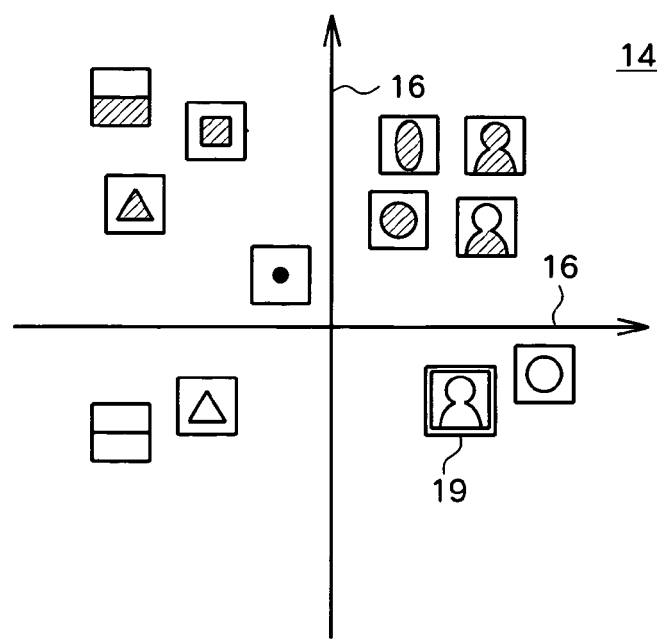
FIG. 4 is a diagram showing an image of a second space.

Then, in this embodiment, by preparing a second space defined by the coordinate axes that correspond to the feature directions calculated as described above, the position coordinate of each image in the second space is calculated. FIG. 4 shows an example of an image of a second space that is displayed by an image displaying apparatus according to the embodiment. Each coordinate axis 16 in the second space 14 corresponds to a feature direction in the first space 10 and represents a typical feature of images of a certain type. In obtaining the position coordinate of each image in the second space 14, specifically, after an inner product of a vector that represents the position coordinate of each image in the first space 10 and a unit vector (the length of the eigenvector of the above similarity matrix H that is set to be 1) that represents each feature direction in the first space 10 is calculated, the inner product value is set to be an element along the coordinate axis 16 corresponding to the feature direction among the position coordinates of images in the second space 14. That is, an inner product of a unit vector ei (i.e., the length of the ith eigenvector of the above similarity matrix H that is set to be 1) and the position coordinate gj of a jth image are calculated, and the resulting value will be that of the ith element of the position coordinate in the second space 14 for the jth image. It should be noted that $1 \leq i \leq M$ where M is the total number of feature directions.

Figure 5:
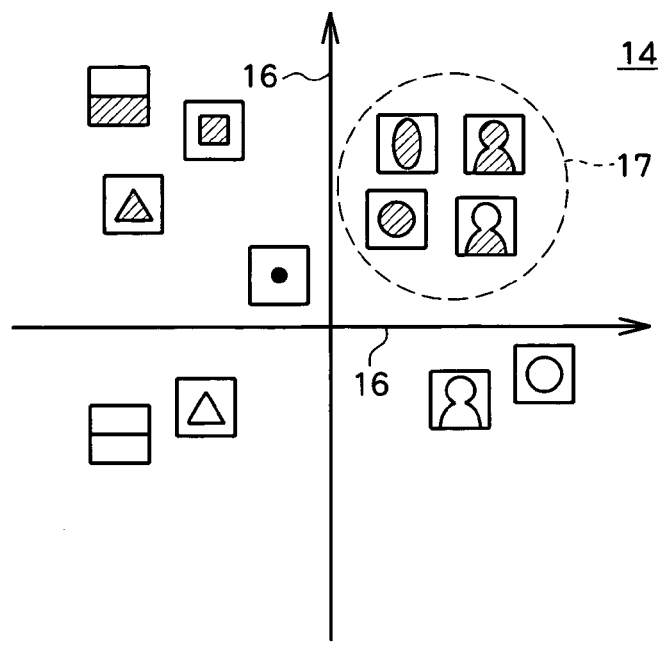
FIG. 5 is a showing a way to specify a block area in a second space.
Figure 6:
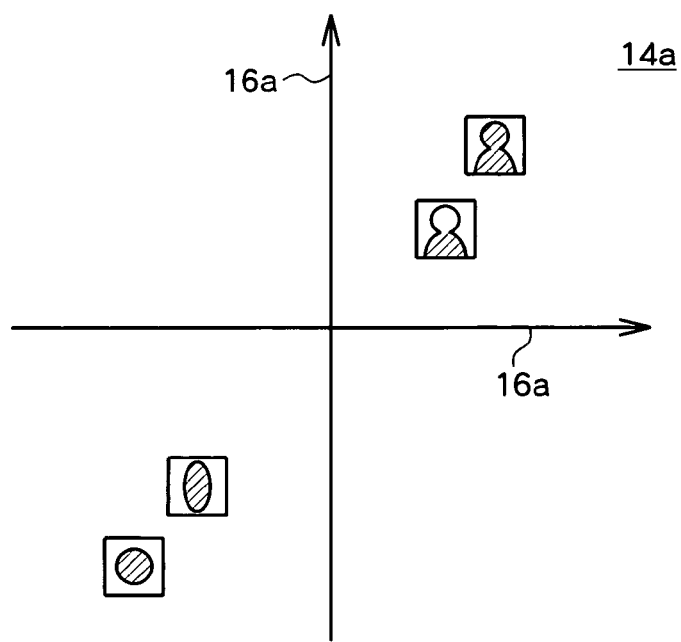
FIG. 6 is a diagram showing an image of an updated second space (a second space for specified images)

As shown in FIG. 4, in the image showing the second space 14, one of the images that are the elements to be analyzed is discriminably displayed with a cursor 19. The cursor 19 is configured to be moved by an operation using operating means such as a mouse or a keyboard of a computer so that a user can discriminably display any image. With one image being discriminably displayed with the cursor 19, the operating means such as a mouse or a key board of a computer may be operated to enlarge the image, as a result of which the discriminably displayed image can be displayed in a larger size on a monitor of the computer. In addition, the operating means such as a mouse or a keyboard of a computer may be operated to specify an area, thereby as shown in FIG. 5, a boundary line 17 can be optionally displayed at a part of the image showing the second space 14. That is, a user can cause the boundary line 17 to be displayed on the monitor using the operating means to specify a block area in the second space 14 at any position in any size. When a block area in the second space 14 is specified, with respect to the images in the area that have position coordinates in the second space 14 in the block area (specified images), an image showing a second space 14A for the specified images is displayed as shown in FIG. 6. This image may be displayed instead of the image showing the second space 14 shown in FIG. 4, or may be displayed with the image showing the second space 14. In generating the image showing the second space 14A for the specified images, first, the position coordinates of the specified images in the first space 10 are obtained again and based on the position coordinates, feature directions in the first space 10 are recalculated. In this recalculation for feature directions, the position coordinates of the images that were not specified by a user are not used. The second space 14A for the specified images has coordinate axes 16A corresponding to the feature directions that are obtained by the recalculation and the specified images are placed in this second space 14A for the specified images. At this point also, after an inner product of a vector that represents the position coordinate for each of the specified images in the first space 10 and a unit vector (the length of an eigenvector in a similarity matrix H' generated based on the position coordinate of each of the specified images in the first space, which is set to be 1) that represents each recalculated feature direction in the first space 10 is calculated, the inner product value is set to be an element along the coordinate axis 16A corresponding to the feature direction among the position coordinates of images in the second space 14A for the specified images. That is, an inner product of a unit vector ei (i.e., the length of the ith eigenvector of the above similarity matrix H' that is set to be 1) and the position coordinate gj of a jth specified image is calculated, the resulting value will be the ith element of the position coordinate in the second space 14A for the jth image.

As can be seen from the comparison between FIG. 5 and FIG. 6, the image showing the second space 14 of FIG. 5 does not clearly illustrate the difference between the two images of an oval and a circle or the two images of a person, while the image showing the second space 14A of FIG. 6 clearly illustrates the differences. That is, the position of the two images of an oval and a circle is widely separated from the position of the two images of a person, and the two images of an oval and a circle are placed close to each other and the two images of a person are also placed close to each other, which means that the image of FIG. 6 more clearly illustrates the minute difference of features between the images than the image of FIG. 5. Since the number of images (specified images) that have position coordinates in a block area in the second space 14 is smaller than the total number of the images, the size of the similarity matrix H' is also small and the eigenvalues/eigenvectors thereof can be calculated at a higher speed. Thus, according to this embodiment, when a user specifies a block area in the second space 14, an image showing the second space 14A for the specified images can be displayed at a high speed in response to the specification.

Figure 7:
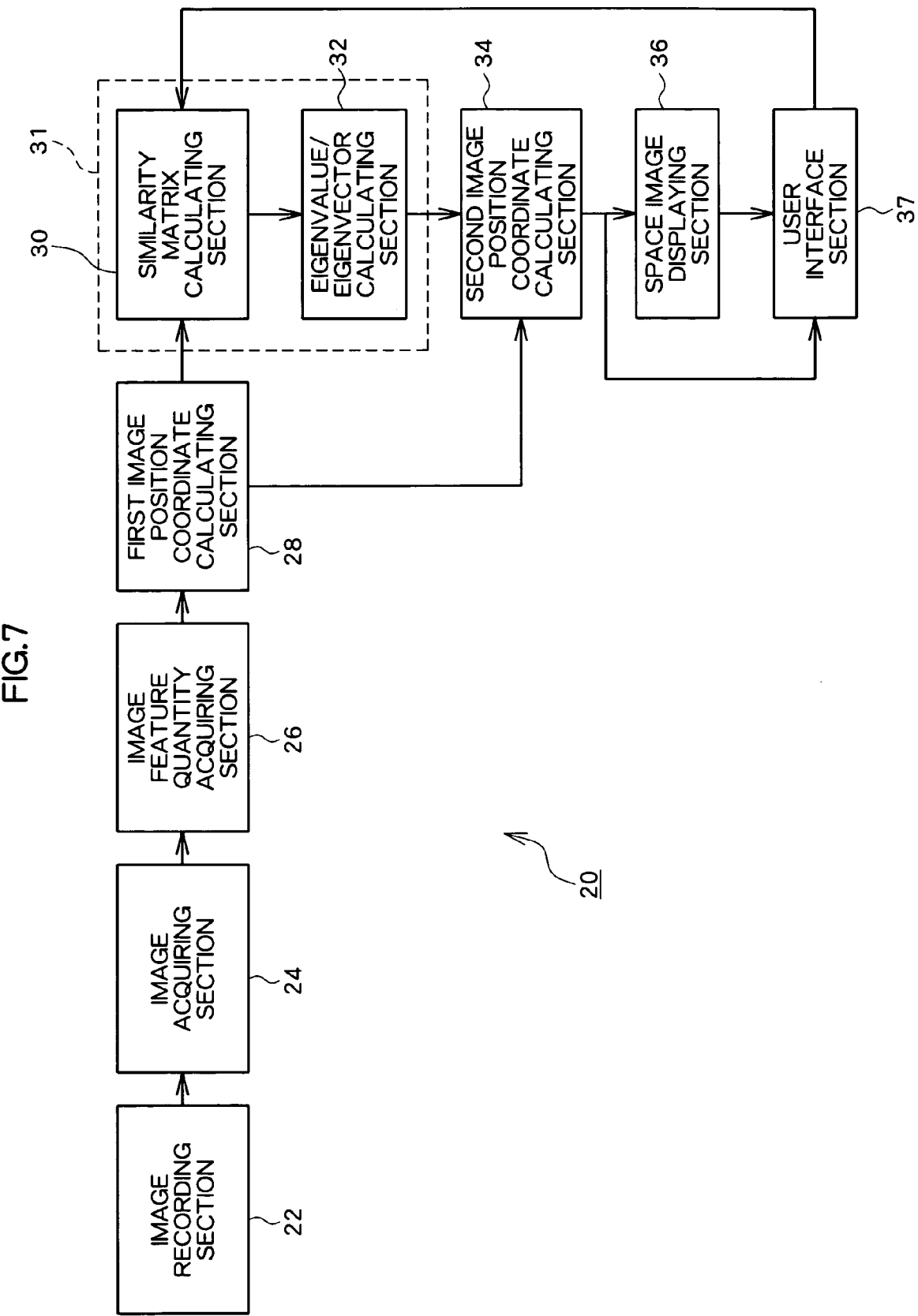
FIG. 7 is a function block diagram showing an embodiment of an image displaying apparatus according to the present invention.

Now, a structure of an image displaying apparatus according to the embodiment will be explained. FIG. 7 is a functional block diagram showing an image displaying apparatus 20 according to the embodiment. The image displaying apparatus 20 can be, for example, achieved by using various computer systems such as a personal computer or a home video game machine and when a program to which the present invention is applied is installed on the computer system and executed, an image recording section 22, an image acquiring section 24, an image feature quantity acquiring section 26, a first image position coordinate calculating section 28, a feature direction calculating section 31, a second image position coordinate calculating section 34, a space image displaying section 36 and a user interface section 37, which are all shown in FIG. 7, can be achieved. The feature direction calculating section 31 includes a similarity matrix calculating section 30 and an eigenvalue/eigenvector calculating section 32.

The image recording section 22 may, for example, include a hard disc storage and stores images that are picked up by digital cameras and images obtained through a communication network such as the Internet. The image recording section 22 also stores character string data for explanations of each image and numerical data for dates when each image was taken, in association with the images.

Figure 8:
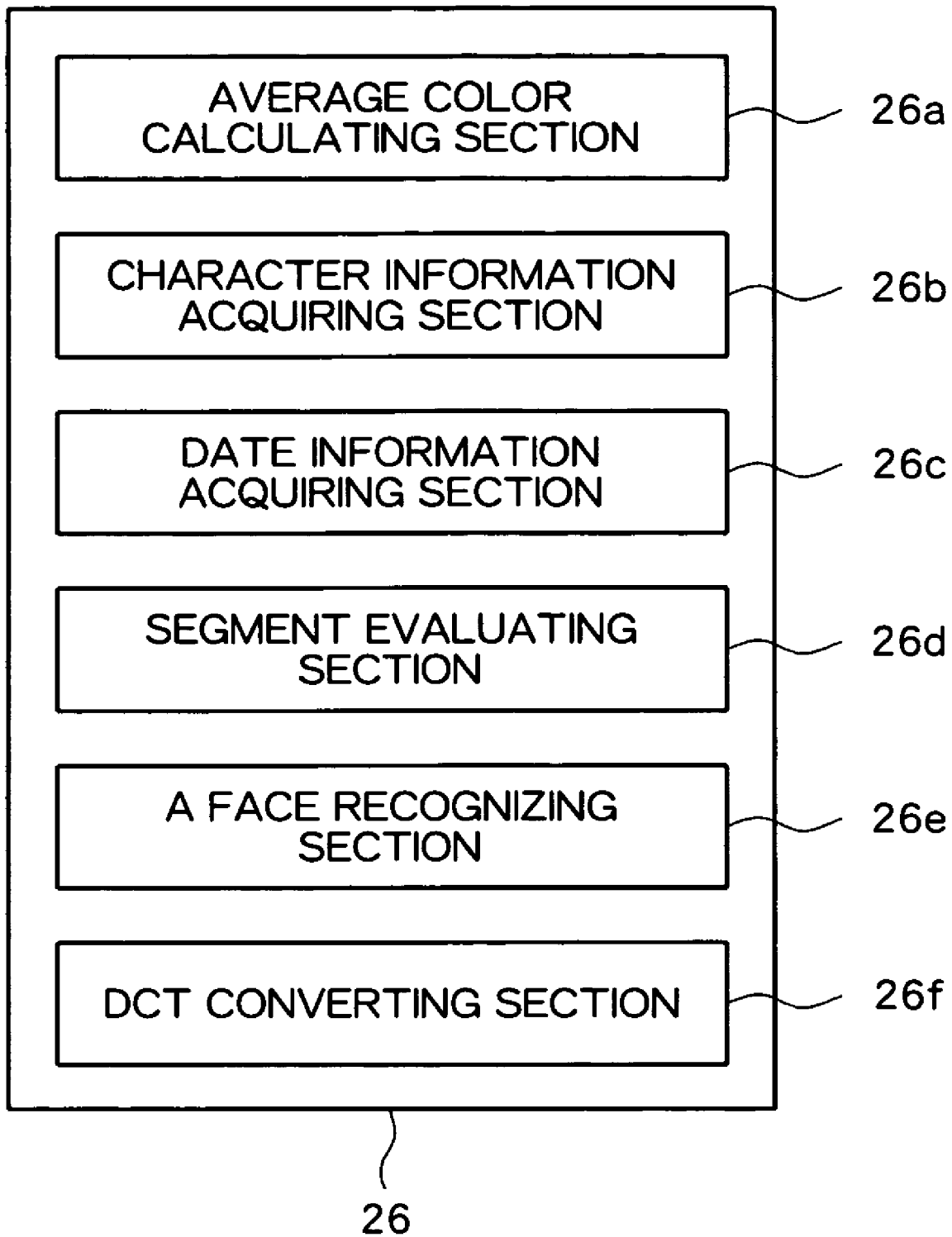
FIG. 8 is a diagram showing a detailed structure of an image feature quantity acquiring section.

The image acquiring section 24 serially acquires the data of each image and the character string data and the numerical data in association with each of the images that are stored in the image recording section 22 and transmits the data to the image feature quantity acquiring section 26. The image feature quantity acquiring section 26 calculates each value of feature quantities of a plurality of types for each of the images transmitted from the image acquiring section 24. In this embodiment, the image feature quantity acquiring section 26 includes, as shown in FIG. 8, an average color calculating section 26a, a character information acquiring section 26b, a date information acquiring section 26c, a segment evaluating section 26d, a face recognizing section 26e and a DCT converting section 26f. The average color calculating section 26a calculates the values g'1i to g'pi of red, green and blue color components that are the average colors of each of the block areas A1 to A12 of each image. The character information acquiring section 26b calculates the values g'p+1i to g'qi that are the number of times a predetermined word is used in a character string data in association with each image, as a value of a feature quantity for each image. The date information acquiring section 26c calculates the values g'q+1i to g'ri that represent whether a date when an image was taken in the date data in association with each image is within a predetermined period of time or not, as a value of a feature quantity for each image. The segment evaluating section 26d calculates the values g'r+1i to g'si that are the number of the segments S having the positions of center of gravity P in each of the block areas A1 to A12 of each image and satisfying a predetermined condition on a height H or a width W, as a value of a feature quantity for each image. The face recognizing section 26e performs processing of face recognition on each image and calculates the value g's+1i that is the number of faces present in the image, as a value of a feature quantity for each image. The processing of face recognition may be performed by using various known approaches. The DCT converting section 26f performs processing of orthogonal transformation on each image and calculates the values g's+2i to g'mi that are the total amount of spatial frequency components within a predetermined range in each of the block areas A1 to A12 of the image, as a value of a feature quantity for each image.

The first image position coordinate calculating section 28 calculates the position coordinate gi (i=1, 2, 3, . . . ) of each of the images in the first space 10 by multiplying the feature quantity of the image, which is calculated as described above, by a weighting factor corresponding to the type of the feature quantity. Such position coordinates obtained in this way are supplied to the similarity matrix calculating section 30 and the second image position coordinate calculating section 34.

The similarity matrix calculating section 30 calculates the similarities Hij between the images (position coordinates in the first space 10) by using the above formula (2) and then calculates a similarity matrix H that has the similarities Hij as matrix elements. The eigenvalues/eigenvectors calculating section 32 calculates eigenvalues/eigenvectors of the similarity matrix H that is calculated in this way. Since the similarity matrix H is a real symmetric matrix, the eigenvalues/eigenvectors thereof can be easily obtained by appropriate computer processing such as a power method. The second image position coordinate calculating section 34 selects all of the eigenvalues or a predetermined number of eigenvalues in decreasing order to make them into unit vectors that represent feature directions in the first space 10. Then the second image position coordinate calculating section 34 calculates an inner product of the vectors and the position coordinates gi that are supplied from the first image position coordinate calculating section 28 to calculate position coordinates of each of the imaged in the second space 14. The position coordinates are supplied to the space image displaying section 36 that places each of the images at the position coordinate of the image in the second space 14 and generates an image of this situation, which is seen from a given observation point (not shown) set in the second space 14, to display it on a monitor.

The user interface section 37 includes operating means such as a mouse or a key board of a computer and is configured to allow a user to specify any image with a cursor 19 shown in the image of FIG. 4 for an operation to enlarge the display of the image or an operation to specify an area within the image. When an operation is performed to enlarge an image, the image that is discriminably displayed by the cursor 19 as described above is enlarged to be displayed on a monitor of a computer. When an operation is performed to specify an area within an image and a block area in the second space 14 is to specified, the user interface section 37 counts the number of images that have the position coordinate in the area. That is, since the user interface section 37 has already obtained the position coordinates of each of the images in the second space 14 from the second image position coordinate calculating section 34, when a user specifies a block area in the second space 14, the user interface section 37 counts the images that have the position coordinate in the area based on the obtained information. The counted number of images greatly influences the amount of processing for the second space 14A for the specified images, which influences the processing time to display an image of the second space 14A for the specified images. So, when the number of the images in the specified area is equal to a predetermined number or more, the user interface section 37 limits recalculations of the feature directions performed by the feature direction calculating section 31. In this case, it is desirable to display a notice on a display or give a notification alarm so that a user can be informed that the number of the specified images is equal to a predetermined number or more.

When the number of the images in the specified area is less than a predetermined number, the user interface section 37 posts the images in the area to the similarity matrix calculating section 30. Then the similarity matrix calculating section 30 again acquires the position coordinates of the posted images in the first space from the first image position coordinate calculating section 28 to calculate a similarity matrix H' by using them. The eigenvalues/eigenvectors calculating section 32 calculates eigenvalues and eigenvectors of the similarity matrix H'. The eigenvectors are used as feature directions in the first space where only the specified images are placed. The second image position coordinate calculating section 34 calculates the position coordinate of each of the specified images in the second space 14A for the specified images, based on the feature directions (eigenvectors) and the position coordinates of each of the specified images in the first space (obtained from the first image position coordinate calculating section 28). Then the space image displaying section 36 uses the position coordinates calculated in this way to display an image of the second space 14A for the specified images on a monitor as shown in FIG. 6.

According to the image displaying apparatus 20 explained above, an image showing the second space 14 is displayed on a monitor, which allows a user to easily understand mutual association between a number of images and to quickly retrieve an image they want to access. When a user can specify any block area in the second space 14, another image showing the second space 14A for the specified images is displayed to represent the mutual association between the images in detail, which allows the user to cause minute feature differences between the images to be displayed on a monitor as needed so that the user can easily retrieve an image they want to access.

The present invention is not limited to the above embodiments and, for example, although images are used as elements to be analyzed in the above explanation, any data such as character strings, pictures, music can be used as elements to be analyzed. In addition, needless to say, various feature quantities can be used for each of the elements to be analyzed.

What is claimed is:

1. An image displaying apparatus, comprising:
    image acquiring means for acquiring a plurality of images;
    image feature quantity calculating means for calculating values of image feature quantities of a plurality of types for each of the images acquired by the image acquiring means;
    first image position coordinate calculating means for calculating the position coordinates of each of the images in a first space, the first space having coordinate axes corresponding to each of the image feature quantities, based on the values calculated by the image feature quantity calculating means;
    feature direction calculating means for calculating one or a plurality of feature directions in the first space, based on the position coordinates calculated by the first image position coordinate calculating means;
    second image position coordinate calculating means for calculating the position coordinates of each of the images acquired by the image acquiring means in a second space, the second space having coordinate axes corresponding to each of the image feature directions calculated by the feature direction calculating means, based on the feature directions calculated by the feature direction calculating means and the position coordinates calculated by the first image position coordinate calculating means; and
    space image displaying means for displaying an image showing the whole or a part of the second space where indications according to each of the images are displayed at each of the position coordinates calculated by the second image position coordinate calculating means.

2. The image displaying apparatus according to claim 1, wherein
    the first image position coordinate calculating means calculates the position coordinate having coordinate components, each corresponding to each of the image feature quantities, each coordinate component has a value of the corresponding image feature quantity, for each of the images.

3. The image displaying apparatus according to claim 2, wherein
    the image feature quantity calculating means calculates at least a part of the values of the image feature quantities based on color information in a part or the whole of each of the images.

4. The image displaying apparatus according to claim 2, wherein
    the image feature quantity calculating means calculates at least a part of the values of the image feature quantities based on the values of predetermined spatial frequency components in a part or the whole of each of the images.

5. The image displaying apparatus according to claim 2, wherein
    the image feature quantity calculating means calculates at least a part of the values of the image feature quantities based on character information or numeric value information associated with each of the images.

6. The image displaying apparatus according to claim 1, wherein
    the image feature quantity calculating means segments each of the images and calculates at least a part of the values of the image feature quantities based on a value with respect to each segment.

7. The image displaying apparatus according to claim 6, wherein
    the image feature quantity calculating means calculates at least a part of the values of the image feature quantities based on at least one of the size or the position of a segment presented in each of the images.

8. The image displaying apparatus according to claim 1, wherein
    each of the images are divided into a plurality of block areas and
    the image feature quantity calculating means calculates a value of the image feature quantity for each block area of each of the images.

9. The image displaying apparatus according to claim 1, wherein,
    the image feature quantity calculating means calculates at least a part of the values of the image feature quantities based on a result of processing of face recognition for each of the images.

10. The image displaying apparatus according to claim 1, wherein the feature direction calculating means calculates one or a plurality of eigenvectors of a similarity matrix that contains the similarities between the position coordinates calculated by the first image position coordinate calculating means as elements in order to set the one or a plurality of eigenvectors to be the one or a plurality of feature directions.

11. The image displaying apparatus according to claim 10, wherein
the second image position coordinate calculating means calculates the position coordinate of each of the images acquired by the image acquiring means in the second space based on an inner product of the feature direction calculated by the feature direction calculating means and the position coordinate calculated by the first image position coordinate calculating means.

12. An image displaying method, comprising:
an image acquiring step for acquiring a plurality of images;
an image feature quantity calculating step for calculating values of image feature quantities of a plurality of types for each of the images acquired in the image acquiring step;
a first image position coordinate calculating step for calculating the position coordinates of each of the images in a first space, the first space having coordinate axes corresponding to each of the image feature quantities, based on the values calculated in the image feature quantity calculating step;
a feature direction calculating step for calculating one or a plurality of feature directions in the first space, based on the position coordinate calculated in the first image position coordinate calculating step;
a second image position coordinate calculating step for calculating the position coordinates of each of the images acquired in the image acquiring step in a second space, the second space having coordinate axes corresponding to each of the image feature directions calculated in the feature direction calculating step, based on the feature direction calculated in the feature direction calculating step and the position coordinate calculated in the first image position coordinate calculating step; and
a space image displaying step for displaying an image showing the whole or a part of the second space where indications according to each of the images are displayed at each of the position coordinates calculated by the second image position coordinate calculating step.

13. A non-transitory computer readable information recording medium which stores a program for enabling a computer to function as:
image acquiring means for acquiring a plurality of images;
image feature quantity calculating means for calculating values of image feature quantities of a plurality of types for each of the images acquired by the image acquiring means;
first image position coordinate calculating means for calculating the position coordinates of each of the images in a first space, the first space having coordinate axes corresponding to each of the image feature quantities, based on the values calculated by the image feature quantity calculating means;
feature direction calculating means for calculating one or a plurality of feature directions in the first space, based on the position coordinate calculated by the first image position coordinate calculating means;
second image position coordinate calculating means for calculating the position coordinates of each of the images acquired by the image acquiring means in a second space, the second space having coordinate axes corresponding to each of the image feature directions calculated by the feature direction calculating means, based on the feature direction calculated by the feature direction calculating means and the position coordinate calculated by the first image position coordinate calculating means; and
space image displaying means for displaying an image showing the whole or a part of the second space where indications according to each of the images are displayed at each of the position coordinates calculated by the second image position coordinate calculating means.

14. An information processing apparatus, comprising:
feature quantity obtaining means for obtaining values of feature quantities of a plurality of types for each of a plurality of elements to be analyzed;
first position coordinate calculating means for calculating the position coordinates of each of the elements to be analyzed in a first space, the first space having coordinate axes corresponding to each of the feature quantities, based on the values obtained by the feature quantity obtaining means;
feature direction calculating means for calculating one or a plurality of feature directions in the first space, based on the position coordinates calculated by the first position coordinate calculating means;
second position coordinate calculating means for calculating the position coordinates of each of the elements to be analyzed in a second space, the second space having coordinate axes corresponding to each of the image feature directions calculated by the feature direction calculating means, based on the feature directions calculated by the feature direction calculating means and the position coordinates calculated by the first position coordinate calculating means;
space image displaying means for displaying an image showing the whole or a part of the second space, the image having indications according to each of the elements to be analyzed, based on each of the position coordinates calculated by the second position coordinate calculating means; and
area specifying means for specifying a block area in the second space, wherein
the feature direction calculating means recalculates one or a plurality of feature directions in the first space, based on the position coordinates, calculated by the first position coordinate calculating means, in the first space of one or a plurality of specified elements to be analyzed that are the elements to be analyzed having position coordinates in the block area in the second space specified by the area specifying means,
the second position coordinate calculating means calculates position coordinates of each of the specified elements to be analyzed in the second space for the specified elements to be analyzed, the second space for the specified elements having coordinate axes, each corresponding to each of the feature directions that are recalculated by the feature direction calculating means, based on the feature directions that are recalculated by the feature direction calculating means and the position coordinates in the first space for the specified elements to be analyzed and
the space image displaying means displaying an image shows the whole or a part of the second space for the specified elements to be analyzed, the image has indications according to the specified elements to be analyzed, based on the position coordinates of each of the specified elements to be analyzed that are calculated by the second position coordinate calculating means.

15. The information processing apparatus according to claim 14, further comprising:
means for counting the number of the elements to be analyzed that have position coordinates in the block area in the second space specified by the area specifying means and limiting a recalculation of the feature directions when the counted number is equal to a predetermined number or more.

16. The information processing apparatus according to claim 14 wherein
the feature direction calculating means calculates one or a plurality of eigenvectors of a similarity matrix that contains similarities between the position coordinates calculated by the first image position coordinate calculating means as elements in order to set the one or a plurality of eigenvectors to be the one or a plurality of feature directions.

17. The information processing apparatus according to claim 16, wherein
the second image position coordinate calculating means calculates the position coordinate of each of the elements to be analyzed in the second space, based on an inner product of the feature direction calculated by the feature direction calculating means and the position coordinate calculated by the first image position coordinate calculating means.

18. The information processing apparatus according to claim 14, wherein
the feature direction calculating means calculates one or a plurality of eigenvectors of a similarity matrix containing similarities between the position coordinates of each of the elements to be analyzed in the first space that are calculated by the first image position coordinate calculating means as elements and again obtains the one or a plurality of eigenvectors as the one or a plurality of feature directions.

19. The information processing apparatus according to claim 18, wherein
the second position coordinate calculating means calculates the position coordinate of each of the elements to be analyzed in the second space for the specified elements to be analyzed, based on an inner product of the feature direction recalculated by the feature direction calculating means and the position coordinate of each of the specified elements to be analyzed in the first space that are calculated by the first position coordinate calculating means.

20. A data analyzing method, comprising:
a feature quantity acquiring step for obtaining values of a plurality of types of feature quantities for each of a plurality of elements to be analyzed;
a first position coordinate calculating step for calculating the position coordinates for each of the elements to be analyzed in a first space, the first space having coordinate axes corresponding to each of the feature quantities, based on the values obtained in the feature quantity acquiring step;
a feature direction calculating step for calculating one or a plurality of feature directions in the first space, based on the position coordinate calculated in the first position coordinate calculating step;
a second position coordinate calculating step for calculating the position coordinates of each of the elements to be analyzed in a second space, the second space having coordinate axes corresponding to each of the feature directions calculated in the feature direction calculating step, based on the feature direction calculated in the feature direction calculating step and the position coordinate calculated in the first position coordinate calculating step;
a space image displaying step for displaying an image showing the whole or a part of the second space, the image having indications according to each of the elements to be analyzed, based on each of the position coordinates calculated in the second position coordinate calculating step;
an area specifying step for specifying a block area in the second space;
a step for recalculating one or a plurality of feature directions in the first space, based on the position coordinates, calculated by the first position coordinate calculating means, in the first space of one or a plurality of specified elements to be analyzed that are the elements to be analyzed having position coordinates in the block area in the second space specified in the area specifying step;
a step for calculating the position coordinate of each of the specified elements to be analyzed in the second space for the specified elements to be analyzed, the space having a coordinate axes, each corresponding to each of the recalculated feature directions, based on the recalculated feature direction and the position coordinate of each of the specified elements to be analyzed in the first space; and
a step for displaying an image showing the whole or a part of the second space for the specified elements to be analyzed, the image having indications according to the specified elements to be analyzed, based on the calculated position coordinate of each of the specified elements to be analyzed in the second space for the specified elements to be analyzed.

21. A non-transitory computer readable information recording medium which stores a program for enabling a computer to function as:
feature quantity obtaining means for obtaining values of feature quantities of a plurality of types for each of a plurality of elements to be analyzed;
first position coordinate calculating means for calculating the position coordinates of each of the elements to be analyzed in a first space, the first space having coordinate axes corresponding to each feature quantity based on the values obtained by the feature quantity obtaining means;
feature direction calculating means for calculating one or a plurality of feature directions in the first space, based on the position coordinate calculated by the first position coordinate calculating means;
second position coordinate calculating means for calculating the position coordinates of each of the elements to be analyzed in a second space, the second space having coordinate axes corresponding to each of the image feature directions calculated by the feature direction calculating means, based on the feature directions calculated by the feature direction calculating means and the position coordinate calculated by the first position coordinate calculating means;
space image displaying means for displaying an image showing the whole or a part of the second space, the image having indications according to the specified elements to be analyzed, based on the position coordinate of each of the elements to be calculated in the second position coordinate calculating means; and
area specifying means for specifying a block area in the second space, wherein the feature direction calculating means recalculates one or a plurality of feature directions in the first space, calculated by the first position coordinate calculating means, in the first space of one or a plurality of specified elements to be analyzed that are the elements to be analyzed having position coordinates in the block area in the second space specified by the area specifying means, the second position coordinate calculating means calculates the position coordinates of each of the specified elements to be analyzed in the second space for the specified elements to be analyzed, the space having coordinate axes, each corresponding to each of the feature directions that are recalculated by the feature direction calculating means, based on the feature directions that are recalculated by the feature direction calculating means and the position coordinates in the first space for the specified elements to be analyzed and the space image displaying means displaying an image shows the whole or a part of the second space for the specified elements to be analyzed, the image having indications according to the specified elements to be analyzed, based on the position coordinates of each of the specified elements to be analyzed that are calculated by the second position coordinate calculating means.

* * * * *